US010315181B2

(12) United States Patent
Fahrenbruck et al.

(10) Patent No.: US 10,315,181 B2
(45) Date of Patent: Jun. 11, 2019

(54) HEATER AND RELATED METHODS THEREFOR

(75) Inventors: Scott Fahrenbruck, Missoula, MT (US); Bruce Hazeltine, Missoula, MT (US)

(73) Assignee: GTAT Corporation, Hudson, NH (US)

( * ) Notice: Subject to any disclaimer, the term of this patent is extended or adjusted under 35 U.S.C. 154(b) by 1430 days.

(21) Appl. No.: 13/246,180

(22) Filed: Sep. 27, 2011

(65) Prior Publication Data
US 2012/0076714 A1  Mar. 29, 2012

Related U.S. Application Data

(60) Provisional application No. 61/386,853, filed on Sep. 27, 2010, provisional application No. 61/386,858, filed on Sep. 27, 2010.

(51) Int. Cl.
*C01B 33/107* (2006.01)
*B01J 19/24* (2006.01)
(Continued)

(52) U.S. Cl.
CPC ....... *B01J 19/2415* (2013.01); *B01J 19/0013* (2013.01); *B01J 19/02* (2013.01); *C01B 33/10757* (2013.01); *F28F 9/20* (2013.01); *B01J 2219/00135* (2013.01); *B01J 2219/00155* (2013.01); *B01J 2219/00159* (2013.01); *B01J 2219/00164* (2013.01); *B01J 2219/029* (2013.01); *B01J 2219/0286* (2013.01)

(58) Field of Classification Search
CPC .... B01J 19/0013; B01J 19/02; B01J 19/2415; B01J 2219/00155; B01J 2219/00164; B01J 2219/0286; C01B 33/10757; C01B 33/10763

USPC .................................................. 423/341, 342
See application file for complete search history.

(56) References Cited

U.S. PATENT DOCUMENTS 2,821,369 A    1/1958  Hillard
3,933,985 A *  1/1976  Rodgers ........................ 423/350
(Continued)

FOREIGN PATENT DOCUMENTS

EP    1454670 B1    9/2004
EP    2000434 A2   12/2008
(Continued)

OTHER PUBLICATIONS

Schunk, "Preserving Our Future with Solar Energy Today," Innovative Insulation Materials, 4 pages.
(Continued)

*Primary Examiner* — Ngoc-Yen Nguyen
(74) *Attorney, Agent, or Firm* — Maine Cernota & Rardin

(57) ABSTRACT

The invention relates generally to heaters and methods of using the heaters. In certain embodiments, a heater includes a pressure shell having a cylindrical heating cavity, an annular heat shield disposed within the cylindrical heating cavity, and at least one heating element disposed within an interior volume of the annular heat shield. In another embodiment, a method of preparing a trichlorosilane includes introducing a reactant stream comprising silicon tetrachloride into a heater, passing electrical current through a heating element to heat the reactant stream, and introducing the heated reactant stream into a reactor.

3 Claims, 5 Drawing Sheets

(51) Int. Cl.
*B01J 19/00* (2006.01)
*B01J 19/02* (2006.01)
*F28F 9/20* (2006.01)
*H05B 1/00* (2006.01)

(56) References Cited

U.S. PATENT DOCUMENTS

| | | | | |
|---|---|---|---|---|
| 4,097,555 | A | * | 6/1978 | Moran ............................ 525/84 |
| 4,165,363 | A | * | 8/1979 | Weigert et al. ................ 423/342 |
| 4,526,769 | A | * | 7/1985 | Ingle et al. .................... 423/342 |
| 4,536,642 | A | | 8/1985 | Hamster et al. |
| 5,126,112 | A | | 6/1992 | Burgie |
| 5,422,088 | A | | 6/1995 | Burgie et al. |
| 5,906,799 | A | | 5/1999 | Burgie et al. |
| 7,442,824 | B2 | | 10/2008 | Paetzold et al. |
| 7,964,155 | B2 | * | 6/2011 | Ishii et al. .................... 422/198 |
| 2004/0047793 | A1 | | 3/2004 | Mleczko et al. |
| 2004/0173597 | A1 | | 9/2004 | Agrawal et al. |
| 2007/0073075 | A1 | | 3/2007 | Paetzold et al. |
| 2009/0324477 | A1 | | 12/2009 | Mizushima et al. |
| 2010/0008842 | A1 | | 1/2010 | Pfluegler et al. |
| 2012/0076714 | A1 | | 3/2012 | Fahrenbruck et al. |

FOREIGN PATENT DOCUMENTS

| | | |
|---|---|---|
| EP | 2085359 A1 | 8/2009 |
| JP | S62123011 A | 6/1987 |
| JP | H07232910 A | 9/1995 |
| JP | H10212181 A | 8/1998 |
| JP | H11273835 A | 10/1999 |
| JP | 2007-091587 | 4/2007 |
| WO | WO-20100113298 A1 | 10/2010 |
| WO | WO-20100116440 A1 | 10/2010 |

OTHER PUBLICATIONS

Partial International Search Report for PCT/US11/053477 dated Feb. 15, 2012, (2 pages).
International Search Report and Written Opinion of the International Searching Authority for PCT/US11/053479 dated Mar. 26, 2012 (18 pages).
Taiwan Search Report dated Feb. 16, 2015 for Taiwan Application No. 100134881, filed on Sep. 27, 2011, 1 page.
Office Action for Taiwan Application No. 100134881, dated Feb. 26, 2015, 9 pages.
Office Action for Japanese Application 2014-516961 dated Mar. 24, 2015, 3 pages.
Malaysia Substantive Examination Adverse Report for Application No. PI 2013004599, dated Jan. 29, 2016.
Database WPI, Week 201069, Thomson Scientific, London, GB; AN 2010-M80185, XP002667608 & WO 2010/113298 A1 (Denki Kagaku Kogyo KK) Oct. 7, 2010, Abstract, Figure 1.
Office Action for Japanese Patent Application No. 2013-530421 dated Jun. 26, 2015 , 5 pages.

* cited by examiner

HEATER AND RELATED METHODS THEREFOR

CROSS-REFERENCE TO RELATED APPLICATIONS

This patent application claims the benefit of U.S. Provisional Patent Application No. 61/386,853 and U.S. Provisional Patent Application No. 61/386,858, both filed on Sep. 27, 2010, the disclosures of which are hereby incorporated by reference herein in their entireties.

FIELD OF THE INVENTION

This invention relates to heaters, systems and to methods of heating and, in particular, to hydrochlorination or hydrogenation heaters and to methods of heating streams in systems and processes for producing trichlorosilane.

BACKGROUND OF THE INVENTION

Trichlorosilane can be produced by hydrogenating silicon tetrachloride according to the following reaction scheme:

$$Si + 2H_2 + 3SiCl_4 \rightarrow 4HSiCl_3 \quad (1)$$

Reaction scheme (1) is typically performed at high pressures, between about 250 psig and 500 psig, and at a reaction temperature in a range of from about 500° C. to about 550° C.

Trichlorosilane can also be produced by hydrochlorinating silicon according to the following reaction scheme:

$$3HCl + Si \rightarrow HSiCl_3 + H_2 \quad (2)$$

Reaction scheme (2) is typically performed at lower pressures, about 50 psig, and at a reaction temperature in a range of from about 300° C. to about 350° C.

SUMMARY OF THE INVENTION

The present invention can involve heaters, systems, and methods of heating one or more reactant streams to produce, for example, trichlorosilane.

One or more aspects of the present invention can be directed to a heater comprising a pressure shell having a cylindrical heating cavity, an annular heat shield disposed within the cylindrical heating cavity, and at least one heating element disposed within an interior volume of the annular heat shield. In some configurations pertinent to one or more aspects of the invention, the at least one heating element can comprise an annular heating structure. The heater can further comprise a cylindrical spacer disposed within an interior region of the annular heating structure. The annular heating structure may be configured to have a serpentine structure. In still other configurations pertinent to one or more further aspects of the invention, the at least one heating element comprises a carbon/carbon composite. In further configurations, the at least one heating element can be configured to have a rod-shaped structure. One or more further aspects of the invention can involve configurations wherein the at least one heating element comprises graphite. Thus, one or more aspects of the invention can involve configurations wherein the at least one heating element comprises one of a carbon/carbon composite, graphite, and nichrome. The at least one heating element can further comprise a silicon carbide coating. One or more still further aspects of the invention can involve configurations wherein the annular heat shield is disposed offset from an interior surface of the heating cavity thereby at least partially defining an annular cooling zone adjacent the interior surface. The heater can further comprise an inlet fluidly connecting the cylindrical heating cavity to a reactant source, and an outlet fluidly connecting the cylindrical heating cavity to a reactor. In some cases, the reactor is a fluidized bed reactor. The reactant source, in accordance with some configurations of the invention, comprises at least one of silicon tetrachloride and hydrogen.

One or more aspects of the invention can be directed to a method of preparing trichlorosilane. The method can comprise introducing a reactant stream comprising silicon tetrachloride into a heater having a pressure shell enclosing a heating chamber, a heat shield disposed within the heating chamber, and a heating element disposed within an interior volume of the heat shield; passing electrical current through the heating element to heat the reactant stream to a target reactant stream temperature; and introducing the heated reactant stream into a reactor having reaction conditions that convert at least a portion of the silicon tetrachloride into trichlorosilane. The target reactant stream temperature is typically in a range of from about 500° C. to about 625° C. The method can further comprise introducing silicon into the reactor. In some instances pertinent to one or more aspects of the invention, a surface of the heating element is wetted by the reactant stream. Introducing the reactant stream into the heater can involve one or more of directing a first portion of the reactant stream through an annular heating zone that is at least partially defined by a central volume of the heat shield, and directing a second portion of the reactant stream through an annular cooling zone that is at least partially defined between a surface of the heat shield and a surface of the heating chamber. The method, in accordance with one or more aspects of the invention can further comprise monitoring a temperature of the heated reactant stream; and adjusting at least one of a voltage and a current of the electrical current passed through the heating element.

One or more aspects of the invention can be directed to a method of facilitating trichlorosilane production. The method can comprise connecting a reactant inlet of a heater to at least one of a source of silicon tetrachloride and a source of hydrogen, the heater having a pressure shell enclosing a heating chamber, a heat shield disposed within the heating chamber, and at least one heating element disposed within an interior volume of heat shield; and connecting a reactant outlet of the heater to an inlet of a hydrochlorination or hydrogenation reactor. The method can further comprise connecting the at least one heating element to at least one electrical power source. The method, in accordance with some configurations of the invention, can further one or more of introducing at least one of silicon tetrachloride and hydrogen into the heater, and establishing an electrical circuit through the at least one heating element.

BRIEF DESCRIPTION OF THE DRAWINGS

The accompanying drawings are not drawn to scale. In the drawings, each identical or nearly identical component that is illustrated in the various figures is represented by a like numeral. For purposes of clarity, not every component may be labeled in every drawing.

In the drawings.

DETAILED DESCRIPTION

One or more aspects of the present invention can pertain to heating systems or heating apparatus or heaters and to methods of use as well as to methods of facilitating heating operations for chemical processes. Further aspects of the invention can pertain to heaters having at least one heating element that is wetted by the process fluid to be heated. Still further aspects of the invention can pertain to heaters having pressurized heating chambers, including configurations having surfaces that are wetted by the process fluid to be heated. Other aspects of the invention can pertain to heaters having corrosion resistant wetted surfaces. Still other aspects of the invention can pertain to heaters having heating elements or component that that are enclosed within a pressure envelope of the heater. In accordance with one or more particular aspects of the invention, the heater can comprise a vessel with a pressure membrane or shell that encloses the process fluid or reactant stream to be heated with one or more heating zones or regions and preferably one or more barrier, buffer, or cooling zones or regions.

One or more embodiments of the invention can be directed to a vessel such as a heater with a shell that can serve as a pressure membrane or pressure vessel. The shell can have one or more heating cavities defined therein. The heater typically further comprises at least one heating element, which is typically disposed in the one or more of the heating cavities. Further notable configurations of the heater in accordance with further aspects of the invention can involve utilizing one or more heat shields. Still further configurations in accordance with one or more aspects of the invention can involve the heater having one or more cylindrically-shaped spacer structures disposed within an interior region of the heating element within the one or more heating cavities. The heater is typically fluidly connected or connectable to one or more reactors and to one or more sources of reactants.

Figure 1:
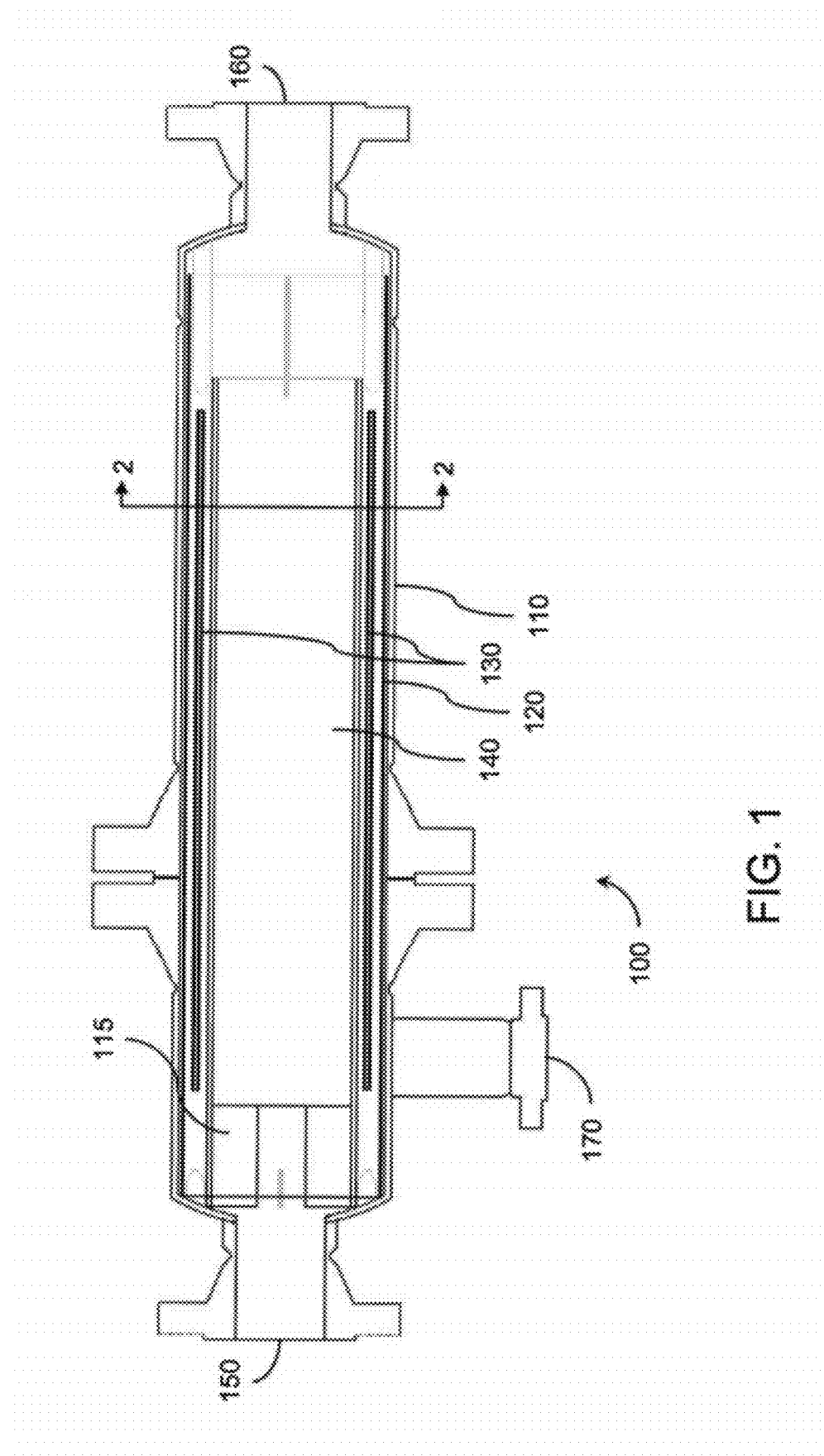
FIG. 1 is a schematic illustration showing a side elevational view of a heater of the invention in which one or more method of the invention may be practiced.
Figure 2:
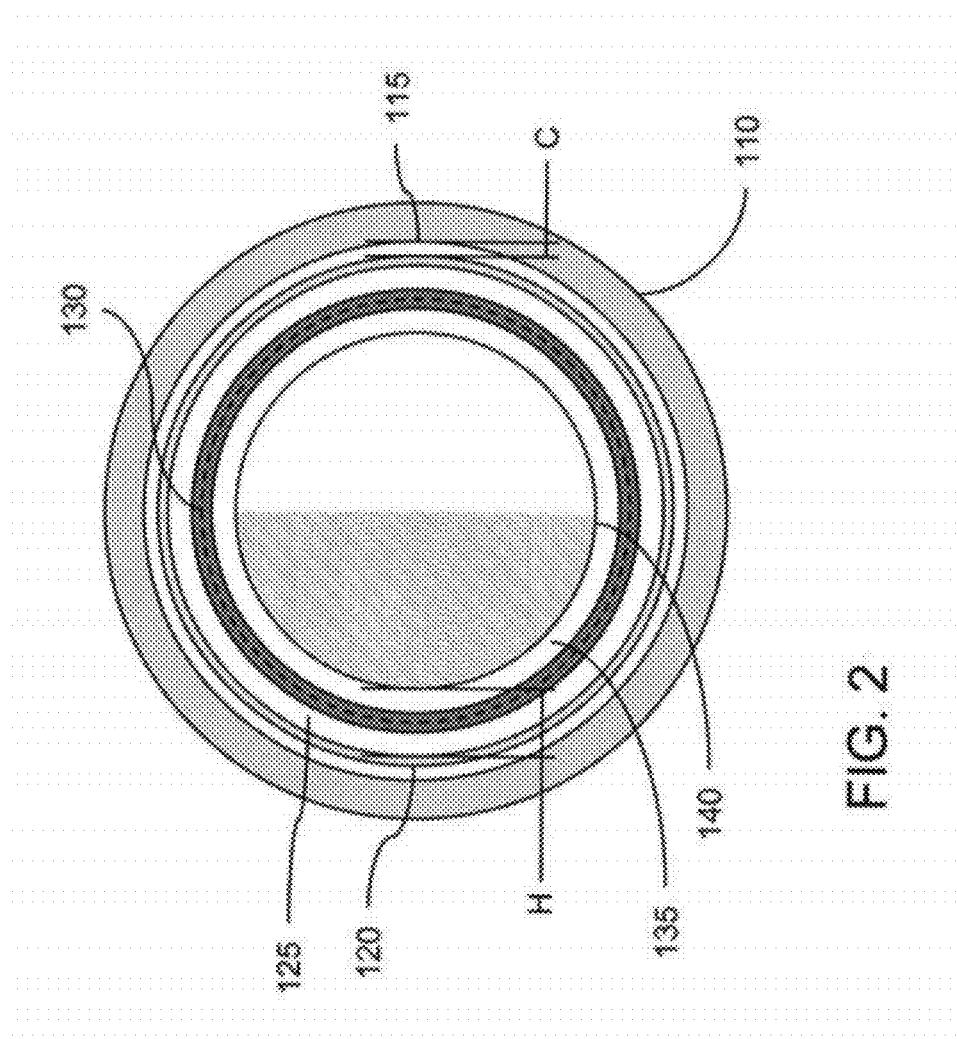
FIG. 2 is a schematic illustration showing a cross-sectional view along line 2-2 of the heater of FIG. 1 upon which one or more embodiments of the invention may be practiced.

As illustrated in the non-limiting configuration presented in FIGS. 1 and 2, heater 100 can comprise a shell 110 that encloses a heating cavity 115 that is defined with shell 110. As illustrated and described, heating cavity 115 has a circular cylindrical configuration; other geometrical configurations, however, may be utilized in variants of one or more embodiments of the present invention. Heater 100 can further comprise at least one heat shields 120 disposed within cavity 115. As illustrated in the preferred configuration, heat shield 120 has annular, cylindrical configuration and is essentially concentrically disposed within cavity 115. Heat shield 120 thus comprises or at least partially defines an interior volume 125.

Heater 100 typically further comprises one or more heating elements 130 that is disposed within interior volume 125 of shield 120. Also as illustrated, heating element 130 is configured as an annular structure having an interior region 135.

Heater 100 can further comprise one or more spacers 140 disposed within interior region 135 of annular heating element 130. Further, heater 100 comprises one or more inlet ports 150 and one or more outlet ports 160. Heater 100 typically further comprises one or more electrical connector ports 170. In accordance with a particular use, the one or more inlet ports 150 of heater 100 can be fluidly connected or connectable to one or more upstream unit operations such as one or more sources of reactants (not shown) and the one or more outlet ports 160 can be fluidly connected or connectable to one or more downstream unit operations (also not shown). Non-limiting examples of downstream unit operations include distillation columns, heat exchangers, and reactors such as fluidized bed reactors.

Other configurations of the components of heater 100 can involve utilizing one or more rod-shaped shaped heating elements disposed within cavity 115. For example, a plurality of parallel rods (not shown) can be longitudinally disposed within cavity 115.

Figure 3:
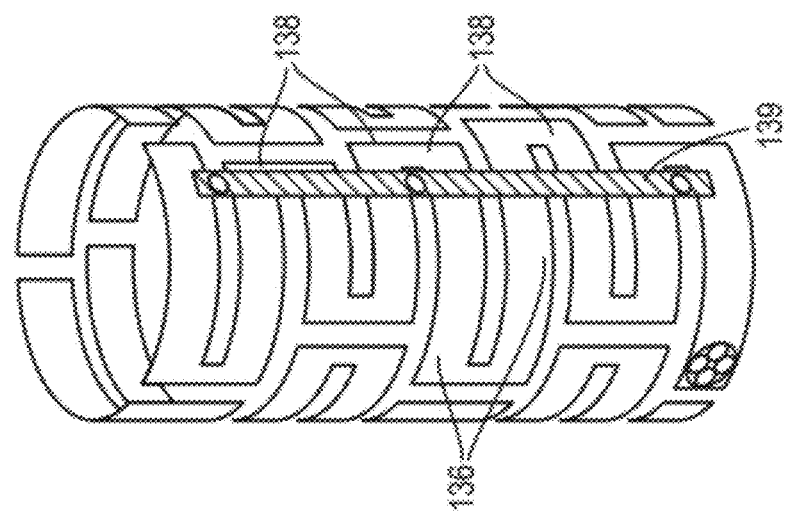
FIG. 3 is a schematic illustration showing a perspective view of a heating element having a serpentine structure that can be utilized in accordance with one or aspects of the invention.
Figure 3:
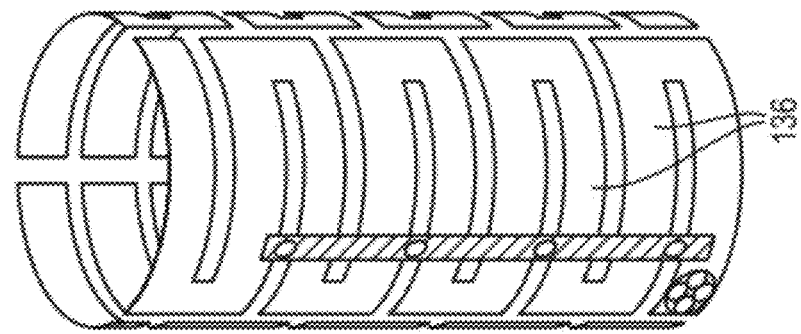
Figure 4:
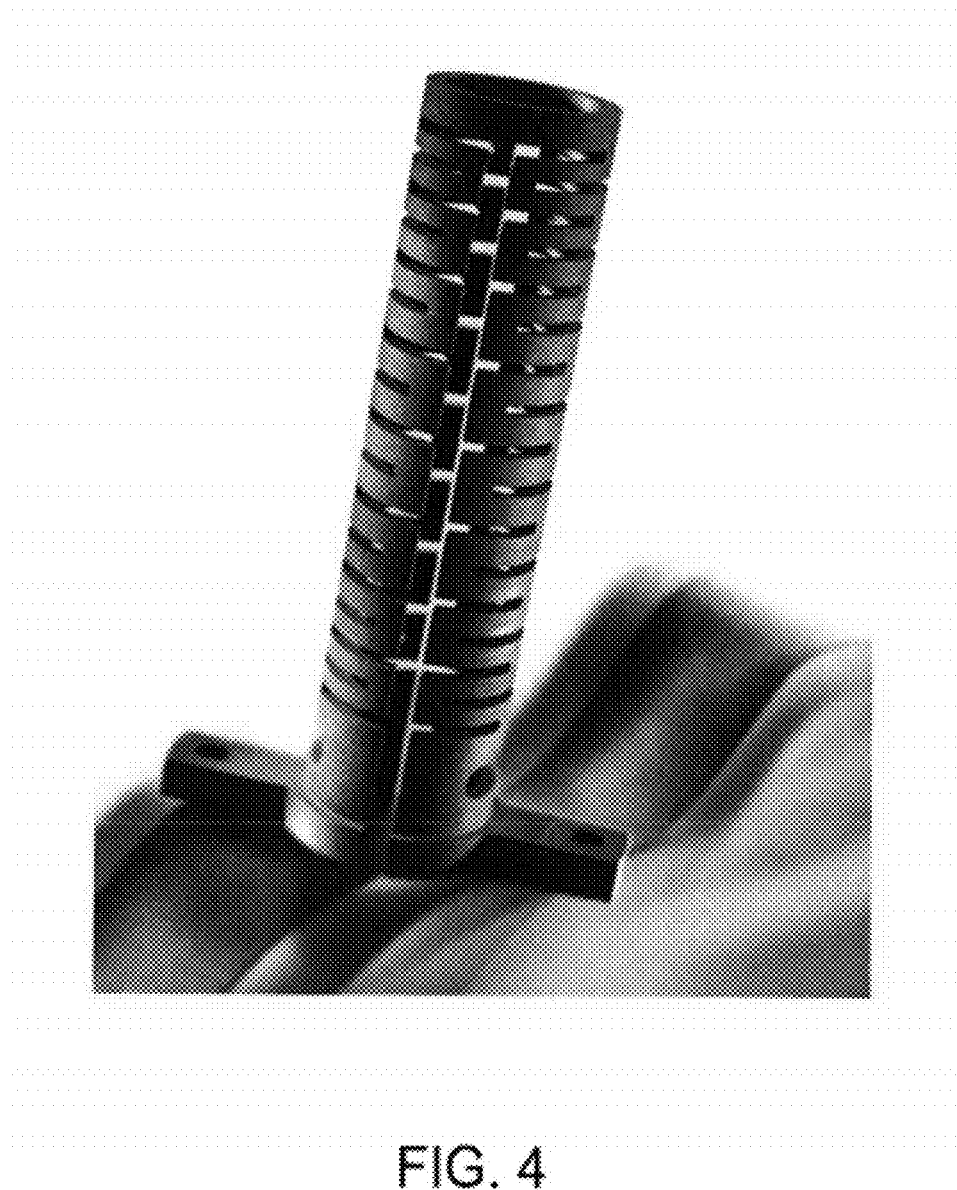
FIG. 4 is a copy of a photograph of a serpentine heating element comprised of a carbon/carbon composite that can be utilized in accordance with one or more embodiments of the present invention.

FIGS. 3 and 4 exemplarily illustrate an embodiment of heating element 130 that can be utilized in accordance with one or more aspects of the invention. As illustrated, heating element 130 can be configured as an annular serpentine or corrugated structure with a plurality of first segments 136 connected through second segments 138 at respective ends thereof. Each of first segments 136 and each of second segments 138 constitutes a linear component wherein each end of each of linear segments 136 is connected to an end of a linear segment 138. As also illustrated in the depicted embodiment, each of linear segments 136 is parallel to each other and each of linear segments 138 is parallel to each other. Other configurations of any of the segments of heating element 130 are contemplated. For example, heating element 130 can comprise curvilinear segments that define a circular annular structure. Further advantageous features that may be utilized include one or more reinforcing or stiffening braces 139, each of which can be disposed longitudinally along annular heating element 130, and secured thereto by one or more pins to prevent or at least inhibit extension, compression, buckling, or bending of annular heating element 130. One or more further reinforcing or stiffening braces can be disposed radially along an inner or outer periphery of annular heating element 130, and secured by one or more pins to provide annular heating element with torsional rigidity.

Figure 5:
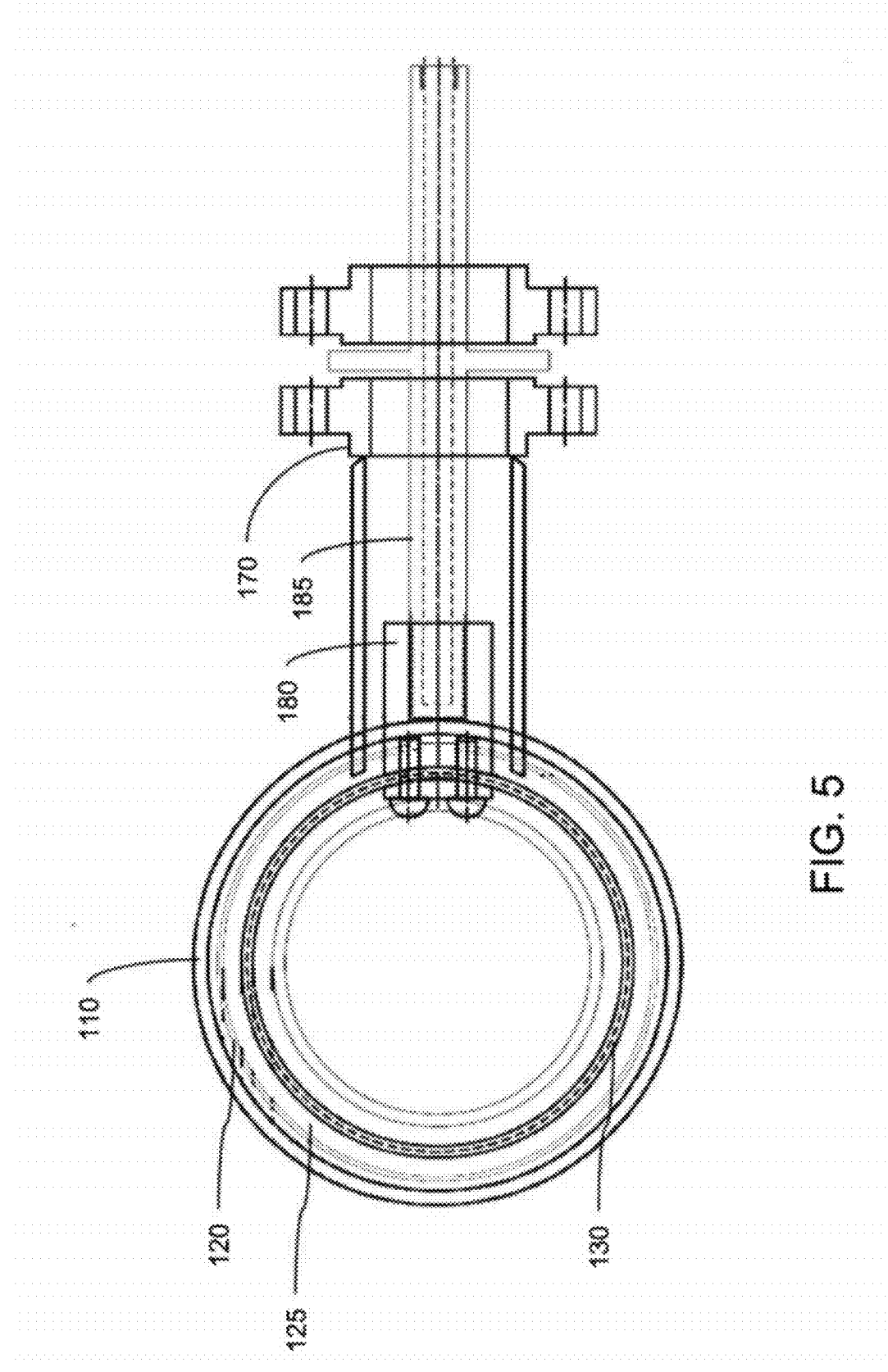
FIG. 5 is a schematic illustration showing a cross-sectional view of a heater through an electrical connector port in accordance with one or more embodiments of the invention.

The heater typically comprises a plurality of chucks that accommodate electrical connectivity between the at least one heating element and one or more electrical power supplies. For example, as shown in FIG. 5, chuck 180 can be connected to a terminal portion of heating element 130 by way of one or more bolts, and also be connected to a conductor 185 disposed within electrical connector port 170 and connected to one or more electrical power supplies, which are configured to provide electrical current through heating element 130. Chuck 180 thus provides an interface between the electrical power supply and the heating element by way of the connector. In some embodiments of the invention, the one or more power supplies can be configured to provide an electrical current with potential or voltage or current, or both, that can be controlled to achieve a particular target value. For example, the potential or current, or both, of the electrical energy passed through the heating element can be regulated to achieve a target heat energy created by the heating element. In other cases, the electrical power can be regulated to achieve a target temperature of a fluid that is heated by the heater. Regulation of the electrical energy can be effected according to conventional techniques.

In an exemplary use directed to, for example, trichlorosilane production, heater 100 can be fluidly connected to one or more reactant sources. Variants of such a configuration can involve utilizing one or more parallel heaters, each of which can be fluidly connected at respective inlet ports thereof to one or more sources of silicon tetrachloride, hydrogen, or mixtures thereof. The one or more reactants can be introduced into the heater through inlet 150 as an inlet stream. Within heater 100, inlet stream can have a plurality of flow paths within heating chamber 115. In accordance with one or more aspects of the invention, the inlet stream can comprise a first or to be heated stream directed to flow within a first region that includes at least a portion, typically all, of the heating surfaces of heating element 130. As exemplarily illustrated in FIG. 2, the first or heating region can be an annular volume H that is at least partially defined by, and is typically within, heat shield 120 and, where utilized, spacer 140. Thus in some cases, the heating region can be annular volume H that is a portion of interior volume 125. The inlet stream can further comprise one or more second or barrier streams, any one or more of such is typically directed to flow in a barrier region that is an annular volume C that is at least partially defined between an interior surface of shell 110 and shield 120. In accordance with one or more advantageous aspects of the invention, the first stream or stream to be heated by heating element 130 can wet or be in contact with surfaces of heating element 130. In embodiments where the fluid within the cavity 115 is pressurized, the wetted surfaces of heating element 130 is exposed to a pressurized first stream. In accordance with still further embodiments of the invention, the first stream and the second stream can then be combined to form an outlet or heated stream to be delivered to downstream unit operations through outlet port 160. In one or more embodiments of the invention, the heated first stream is typically heated to a preliminary target temperature with sufficient internal energy to provide an outlet stream having a target heated stream temperature, after mixing with the second stream. It is believed that the preliminary target temperature is greater than the target stream temperature because the second stream is expected to have a lower temperature. In embodiments directed to facilitating trichlorosilane, for example, the first stream is heated to achieve a preliminary target stream temperature such that an outlet stream has a target reactant stream temperature in a range of from about 500° C. to about 625° C., but can be in a range of from about 500° C. to about 600° C., in a range of from about 525° C. to about 575° C., in a range of from about 500° C. to about 550° C., depending on several factors including, for example, the composition of the reactant stream, the relative amounts of the reactant components of the reactant stream, and the temperature of other reactant streams, if any, to be mixed with the stream from heater 100.

Among some of the particular advantageous features of the invention is that the heaters have internal components that are encased within the pressure shell 110, which allows failure of any of such components without escape of the pressurized fluid stream from the pressure envelope. In further advantageous aspects of the invention, in contrast to prior art immersion-type heaters, the heater of the present invention can utilize heating elements, with electrical current passing therethrough, that are wetted by the fluid to be heated. In still further advantageous aspects of the invention, the heater can utilize convective heat transfer from a wetted surface of an electrically energized heating element to the fluid to be heated. In yet further aspects of the invention, heat energy is predominantly convectively transferred to the fluid to be heated from a surface of a heating element, In yet other aspects of the invention, heat is not conductively transferred from the surface of the electrically energized heating element.

Controller system that can be utilized to facilitate a target reactant temperature can involve utilizing one or more controllers that employ any of feedback or feedforward, or both, algorithms. For example, the control system can have a microprocessor that receives one or more input signals from one or more sensors, and generate one or more output signals that adjusts an operating parameter, e.g., potential or current, or both, of the electrical energy passed through the heating element. The one or more sensors can be, for example, temperature sensors and flow sensors, any of which can be disposed upstream of inlet 150 or downstream of outlet 160.

The materials of construction of the various components of the heater can be metallic, such as steel that is resistant to corrosion of the fluid at the operating conditions of the heater. For example, pressure shell 110, shield 120, and spacer 140 can be comprised of stainless steel, high nickel steel such as any of the grades of any of INCOLOY and INCONEL steel.

Having now described some illustrative configurations and embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives.

Those skilled in the art should appreciate that the parameters and configurations described herein are exemplary and that actual parameters and/or configurations will depend on the specific application in which the systems and techniques of the invention are used. Those skilled in the art should also recognize or be able to ascertain, using no more than routine experimentation, equivalents to the specific embodiments of the invention. It is therefore to be understood that the embodiments described herein are presented by way of example only and that, within the scope of the appended claims and equivalents thereto; the invention may be practiced otherwise than as specifically described.

Moreover, it should also be appreciated that the invention is directed to each feature, system, subsystem, or technique described herein and any combination of two or more features, systems, subsystems, or techniques described herein and any combination of two or more features, systems, subsystems, and/or methods, if such features, systems, subsystems, and techniques are not mutually inconsistent, is considered to be within the scope of the invention as embodied in the claims. Further, acts, elements, and features discussed only in connection with one embodiment are not intended to be excluded from a similar role in other embodiments.

As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A method of facilitating trichlorosilane production, comprising:
   introducing a reactant stream containing at least one of silicon tetrachloride and hydrogen into an inlet of a heater having:
      a pressure shell enclosing a heating chamber;
      a heat shield shaped as an open-ended cylinder, said cylindrical heat shield being disposed within the heating chamber and concentric therewith;
      at least one heating element shaped as an open-ended cylinder, said cylindrical heating element being disposed within an interior volume of the cylindrical heat shield and concentric therewith; and
      a spacer shaped as a closed-ended cylinder, said spacer being disposed within an interior volume of the cylindrical heating element;
   causing at least a portion of said reactant stream to flow through an annular heating region defined by said cylindrical heat shield and said spacer, thereby bringing the reactant stream into direct physical contact with the cylindrical heating element; and
   directing said reactant stream through an outlet of the heater and into an inlet of any of a hydrochlorination reactor and a hydrogenation reactor.

2. The method of claim 1, further comprising applying electrical current to said at least one heating element from at least one electrical power source.

3. The method of claim 1, wherein the reactant stream flows from the inlet to the outlet through a channel that does not reverse its direction.

* * * * *